(12) United States Patent  
Okazaki

(10) Patent No.: US 11,280,892 B2  
(45) Date of Patent: Mar. 22, 2022

(54) MEASURING DEVICE, INFORMATION PROCESSING DEVICE, AND COMMUNICATION SYSTEM

(71) Applicant: OMRON HEALTHCARE Co., Ltd., Kyoto (JP)

(72) Inventor: Tetsuzo Okazaki, Kyoto (JP)

(73) Assignee: OMRON HEALTHCARE CO., LTD., Kyoto (JP)

( * ) Notice: Subject to any disclaimer, the term of this patent is extended or adjusted under 35 U.S.C. 154(b) by 0 days.

(21) Appl. No.: 17/152,072

(22) Filed: Jan. 19, 2021

(65) Prior Publication Data

US 2021/0141073 A1    May 13, 2021

Related U.S. Application Data

(63) Continuation of application No. PCT/JP2019/027761, filed on Jul. 12, 2019.

(30) Foreign Application Priority Data

Jul. 30, 2018 (JP) .............................. JP2018-142307

(51) Int. Cl.
*H04W 4/38* (2018.01)
*G01S 11/02* (2010.01)
*H04W 12/033* (2021.01)
*H04W 48/16* (2009.01)

(52) U.S. Cl.
CPC ............. *G01S 11/026* (2013.01); *H04W 4/38* (2018.02); *H04W 12/033* (2021.01); *H04W 48/16* (2013.01)

(58) Field of Classification Search
CPC ................................ H04W 12/03; H04W 4/38
See application file for complete search history.

(56) References Cited

U.S. PATENT DOCUMENTS

| 2011/0033046 A1 | 2/2011 | Yuichi et al. |
| 2016/0029149 A1 | 1/2016 | Morikawa et al. |
| 2017/0272122 A1* | 9/2017 | Nagasaki ............... H04L 47/34 |

(Continued)

FOREIGN PATENT DOCUMENTS

| CN | 102016958 A | 4/2011 |
| CN | 105594236 A | 5/2016 |
| EP | 2287824 A1 | 2/2011 |

(Continued)

*Primary Examiner* — Michael T Vu
(74) *Attorney, Agent, or Firm* — Birch, Stewart, Kolasch & Birch, LLP

(57) ABSTRACT

A measuring device (10) that is portable is configured to be capable of BLE communication with an information processing device (20). The measuring device (10) is configured to acquire living body related information of a user, receive a first advertising packet transmitted at a predetermined cycle from an information processing device (20), start encryption of the living body related information using a public key when the first advertising packet is received, calculate an estimated distance between the measuring device (10) and the information processing device (20) on the basis of a received signal strength indicator of the first advertising packet, and transmit a second advertising packet including the living body related information thus encrypted when the estimated distance is less than a first threshold.

9 Claims, 9 Drawing Sheets

(56) References Cited

U.S. PATENT DOCUMENTS

2017/0303119 A1* 10/2017 Ogura ................ G06F 21/6245
2020/0186987 A1*  6/2020 Choi ..................... H04W 4/70

FOREIGN PATENT DOCUMENTS

| JP | 2017-5411 A | 1/2017 |
| JP | 2017-12661 A | 1/2017 |
| WO | 2009/147788 A1 | 12/2009 |
| WO | 2015/045372 A1 | 4/2015 |

* cited by examiner

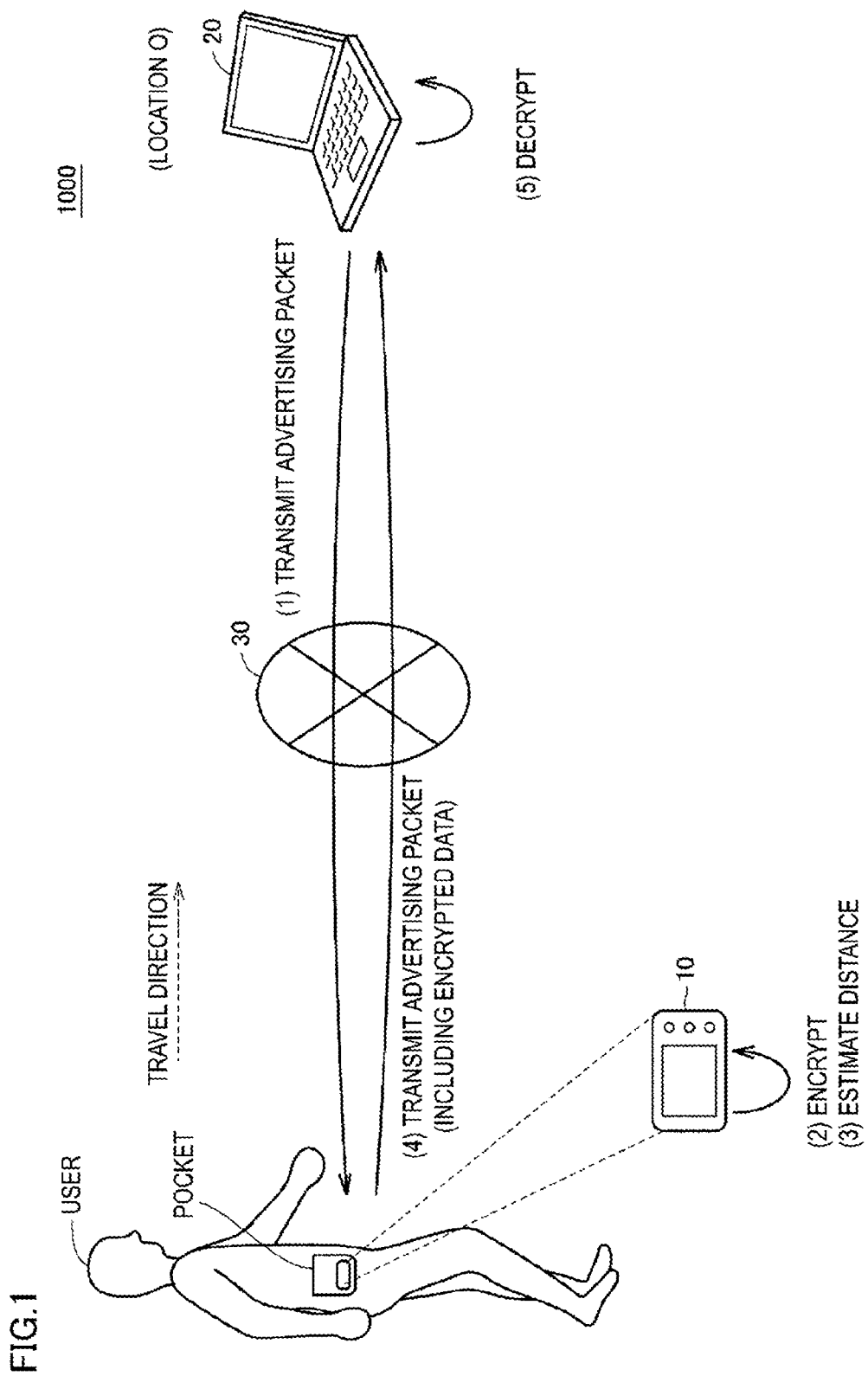

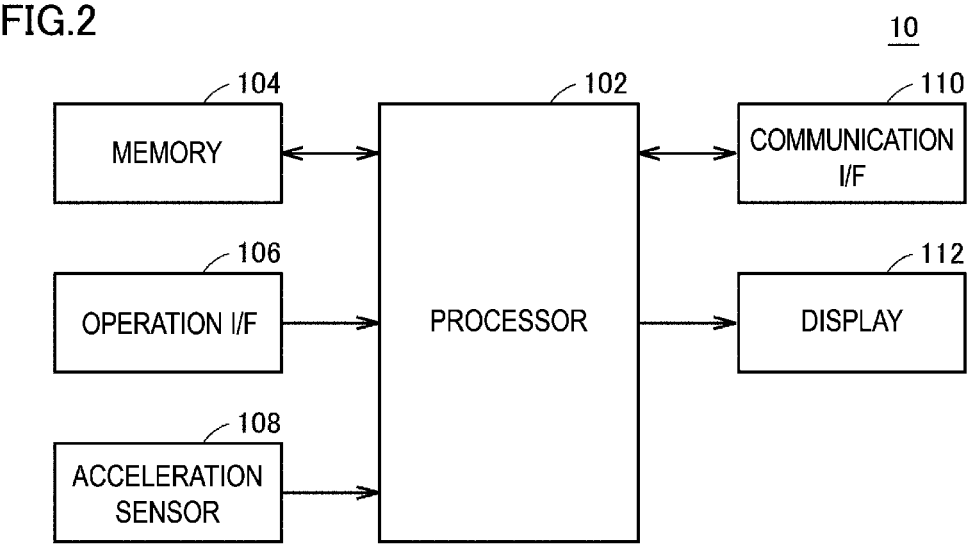
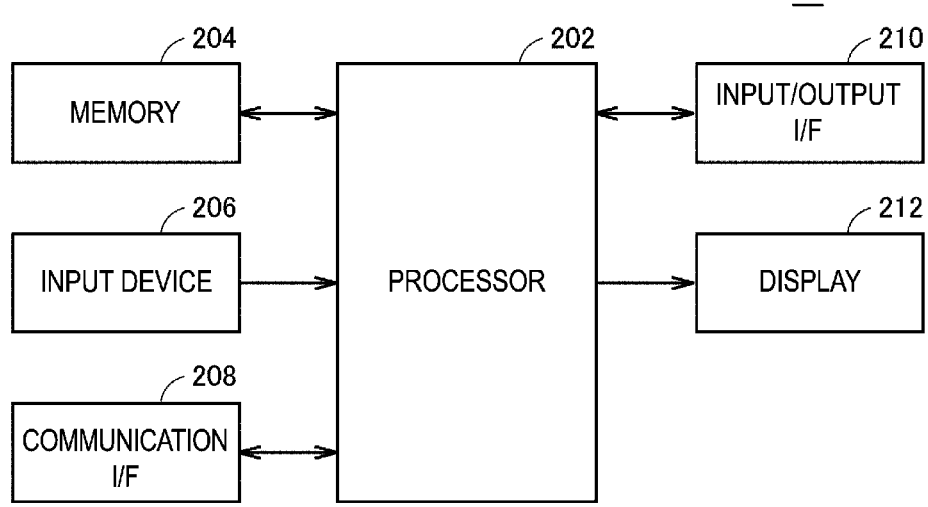

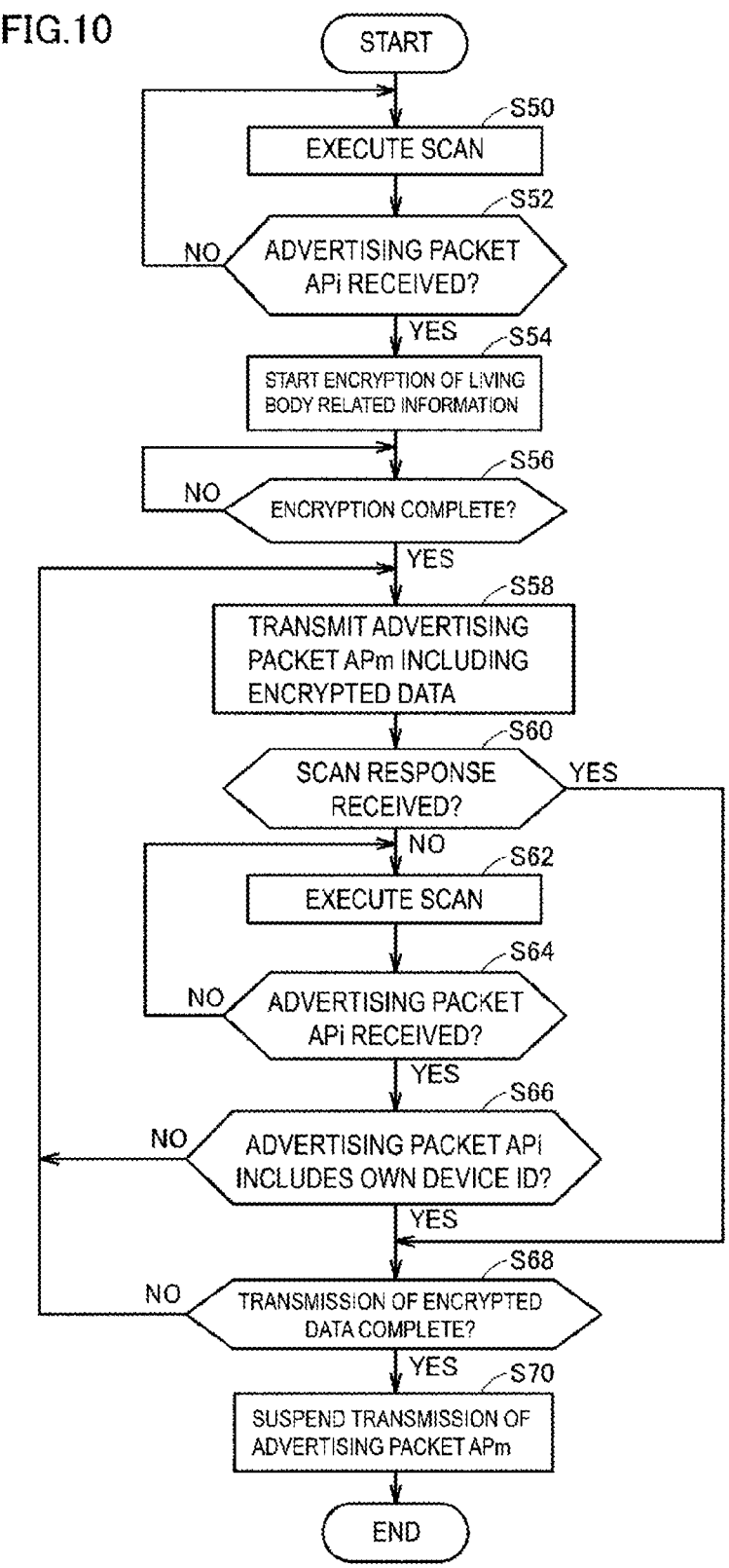

MEASURING DEVICE, INFORMATION PROCESSING DEVICE, AND COMMUNICATION SYSTEM

CROSS-REFERENCE TO RELATED APPLICATIONS

This application is the U.S. national stage application filed pursuant to 35 U.S.C. 365(c) and 120 as a continuation of International Patent Application No. PCT/JP2019/027761, filed Jul. 12, 2019, which application claims priority from Japanese Patent Application No. 2018-142307, filed Jul. 30, 2018, which applications are incorporated herein by reference in their entireties.

TECHNICAL FIELD

The present disclosure relates to a measuring device, an information processing device, and a communication system.

BACKGROUND ART

In recent years, Bluetooth (trade name) Low Energy (BLE) communication that enables near-field wireless communication with low power consumption has become ubiquitous. For example, there are known communication systems in which a biological information measurement device configured to utilize BLE communication to measure biological information of a user provides the biological information to a communication terminal.

JP 2017-5411 A (Patent Document 1) discloses a communication system including a communication terminal and a biological information measurement device. The communication terminal, which is a central device, includes:
a service identification unit configured to identify a communication rule used for communication with one biological information measurement device, from among a plurality of communication rules indicating different encryption methods based on a cryptographic key used for communication with a biological information measurement device, which is a peripheral device, and
a communication unit configured to communicate predetermined purpose information to the one biological information measurement device, based on the communication rule thus identified by the service identification unit.

CITATION LIST

Patent Literature

Patent Document 1: JP 2017-5411 A

SUMMARY OF INVENTION

Technical Problem

In order to ensure the security of BLE communication between the communication terminal and the biological information measurement device, encrypted communication using a common key or a public key can be considered. When a common key is used, different common keys need to be distributed to numerous biological information measurement devices, which is cumbersome.

Therefore, the use of a public key is assumed. Generally, however, with a biological information measurement device not equipped with a microcomputer having high computational power such as a personal computer, there is a problem in that the encryption process that uses a public key is relatively time-consuming. Accordingly, when a communication terminal acquires encrypted data (for example, biological information) from numerous biological information measurement devices existing in the periphery, the acquisition of the data may not proceed smoothly, resulting in a reduction in usability.

In Patent Document 1, when the biological information measurement device and the communication terminal are connected by a third service, information used for the measurement of biological information is encrypted by a predetermined method (for example, a common key method or a public key method), and the biological information thus encrypted is decrypted by the predetermined method. Nevertheless, in Patent Document 1, there is no disclosure or suggestion of technology related to the aforementioned problem.

An object of an aspect of the present disclosure is to provide a measuring device configured to measure living body related information, an information processing device, and a communication system, the measuring device, the information processing device, and the communication system being capable of improving usability when data encrypted using a public key are communicated via BLE between the measuring device and the information processing device.

Solution to Problem

In one example of the present disclosure, provided is a measuring device that is portable and configured to be capable of Bluetooth Low Energy (BLE) communication with an information processing device. The measuring device includes an acquisition unit configured to acquire living body related information of a user of the measuring device, a reception unit configured to receive a first advertising packet transmitted at a predetermined cycle from the information processing device, an encryption unit configured to start encryption of the living body related information using a public key when the first advertising packet is received, a distance estimation unit configured to calculate an estimated distance between the measuring device and the information processing device, based on a received signal strength indicator of the first advertising packet, and a transmission control unit configured to transmit a second advertising packet including the living body related information thus encrypted when the estimated distance is less than a first threshold.

According to the configuration described above, it is possible to improve usability when data encrypted using a public key are communicated via BLE between the measuring device configured to measure living body related information and the information processing device.

In another example of the present disclosure, when the first advertising packet received after transmission of the second advertising packet includes information indicating that the information processing device received the second advertising packet, the transmission control unit is configured to suspend transmission of the second advertising packet.

According to the configuration described above, the occurrence of wireless interference when another device and the information processing device communicate via BLE can be reduced.

In another example of the present disclosure, when a first reference time or longer has elapsed since suspension of transmission of the second advertising packet, the transmission control unit is configured to cancel the suspension of transmission of the second advertising packet.

According to the configuration described above, it is possible to set the second advertising packet including the living body related information newly acquired after transmission of the second advertising packet into a state transmittable by the measuring device.

In another aspect of the present disclosure, when transmission of the second advertising packet is suspended and a second reference time or longer elapses after reception of the first advertising packet becomes impossible, the transmission control unit is configured to cancel the suspension of transmission of the second advertising packet.

According to the configuration described above, it is possible to set the second advertising packet including the living body related information newly acquired after transmission of the second advertising packet into a state transmittable by the measuring device.

In another example of the present disclosure, the transmission control unit is configured to transmit the second advertising packet at a first cycle when the estimated distance is less than the first threshold and is greater than or equal to a second threshold that is less than the first threshold and transmit the second advertising packet at a second cycle shorter than the first cycle when the estimated distance is less than the second threshold.

According to the configuration described above, a transmission frequency of the second advertising packet is increased when the estimated distance is short and there is less susceptibility to wireless interference, making it possible to efficiently complete transmission of the encrypted data at an early stage.

In another example of the present disclosure, the living body related information includes a walking speed of the user who carries the measuring device. When the walking speed is greater than or equal to a predetermined speed, the transmission control unit is configured to transmit the second advertising packet at the second cycle.

According to the configuration described above, when the possibility exists that the user will approach the information processing device quickly, the transmission of the encrypted data can be completed at an early stage.

In another example of the present disclosure, the measuring device further includes a notification unit configured to notify the user of a progress status of a series of processes until completion of transmission of the living body related information thus encrypted.

According to the configuration described above, the user can identify the progress status of the series of processes.

In another example of the present disclosure, an information processing device configured to be capable of Bluetooth Low Energy (BLE) communication with a measuring device that is portable includes a transmission unit configured to transmit a first advertising packet at a predetermined cycle; and a reception unit. The measuring device is configured to start encryption of living body related information of a user of the measuring device using a public key when the first advertising packet is received. The information processing device includes the reception unit that is configured to receive a second advertising packet including the living body related information thus encrypted and transmitted from the measuring device when an estimated distance between the information processing device and the measuring device based on a received signal strength indicator of the first advertising packet is less than a first threshold.

According to the configuration described above, it is possible to improve usability when data encrypted using a public key are communicated via BLE between the measuring device configured to measure living body related information and the information processing device.

In another example of the present disclosure, a communication system includes a plurality of measuring devices, each being portable; and an information processing device configured to be capable of Bluetooth Low Energy (BLE) communication with each of the plurality of measuring devices. Each of the plurality of measuring devices includes an acquisition unit configured to acquire living body related information of a user of the measuring device, a reception unit configured to receive a first advertising packet transmitted at a predetermined cycle from the information processing device, an encryption unit configured to start encryption of the living body related information using a public key when the first advertising packet is received, a distance estimation unit configured to calculate an estimated distance between the measuring device and the information processing device, based on a received signal strength indicator of the first advertising packet, and a transmission control unit configured to transmit a second advertising packet including the living body related information thus encrypted when the estimated distance is less than a first threshold.

According to the configuration described above, it is possible to improve usability when data encrypted using a public key are communicated via BLE between the measuring device configured to measure living body related information and the information processing device.

Advantageous Effects of Invention

According to the present disclosure, it is possible to improve usability when data encrypted using a public key are communicated via BLE between a measuring device configured to measure living body related information and an information processing device.

BRIEF DESCRIPTION OF DRAWINGS

FIG. 1 is a diagram illustrating an outline of a communication system according to the present embodiment.

FIG. 2 is a block diagram illustrating an example of a hardware configuration of a measuring device.

FIG. 3 is a block diagram illustrating an example of a hardware configuration of an information processing device.

FIG. 10 is a flowchart illustrating an example of a processing procedure of the measuring device.

DESCRIPTION OF EMBODIMENTS

Figure 4:
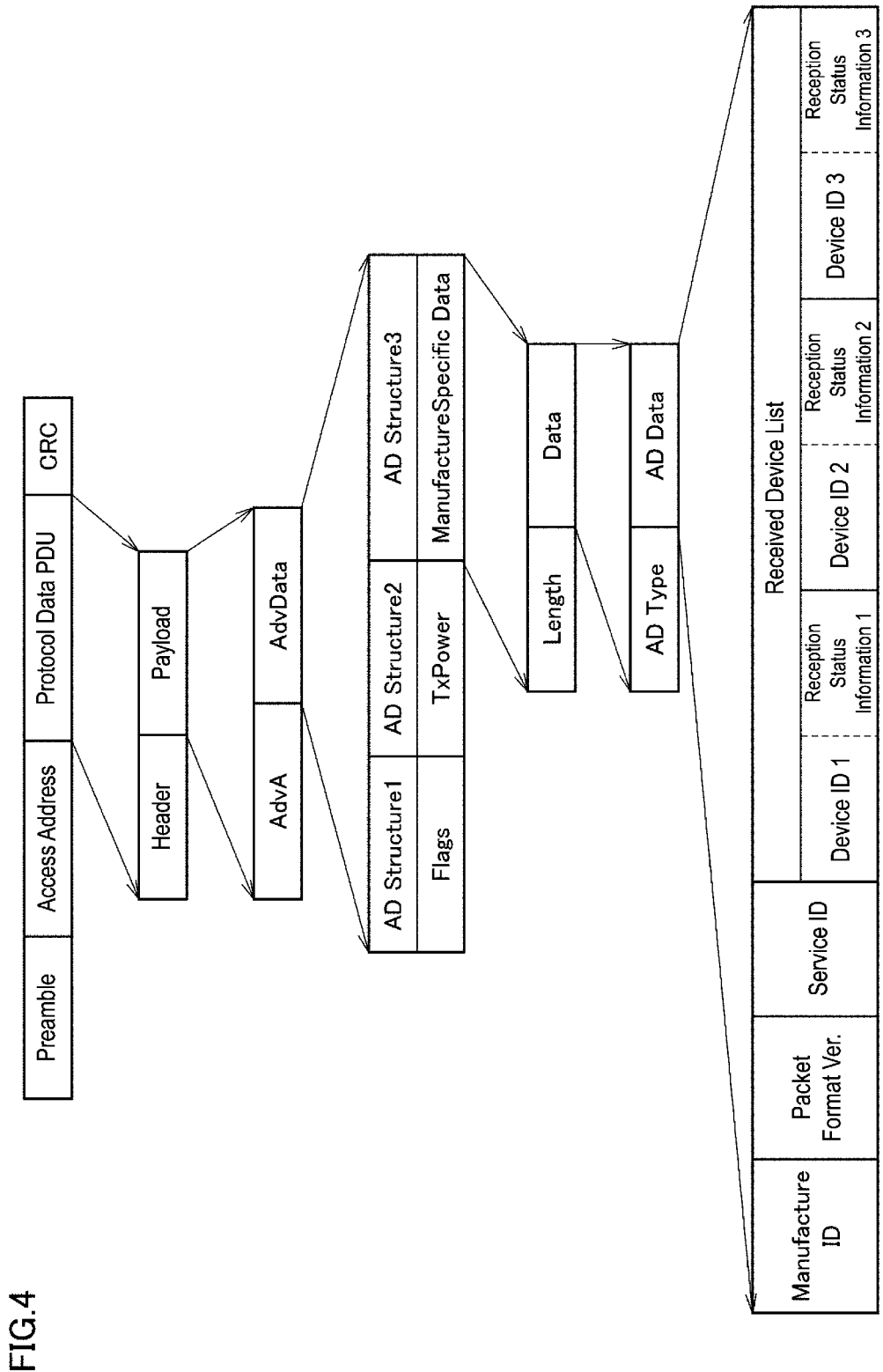
FIG. 4 is a diagram illustrating a data structure of an advertising packet transmitted from the information processing device.

Embodiments of the present invention will be described below with reference to the drawings. In the following description, like components are given like numerals. Names and functions thereof are also the same. Thus, the detailed description of such components is not repeated.

Application Example

FIG. 1 is a diagram illustrating an outline of a communication system 1000 according to the present embodiment. With reference to FIG. 1, an example of a scenario in which the present invention is applied will be described.

Referring to FIG. 1, the communication system 1000 includes a measuring device 10 that is portable, an information processing device 20, and a network 30. The measuring device 10 is portable by a user and accommodated in a pocket or the like of clothing of the user, for example. Note that, for convenience of explanation, the communication system 1000 includes only one measuring device 10 corresponding to one user, but may include a plurality of measuring devices 10 respectively corresponding to a plurality of users.

The measuring device 10 is a device for measuring living body related information of the user of the measuring device 10, the user being a measurement subject. The living body related information is biological information of the user and information related thereto. In the present embodiment, the measuring device 10 is an activity meter configured to measure an activity amount corresponding to the physical activity of the user. The activity amount is, for example, a number of steps, a walking speed, and heat consumption (that is, calorie consumption) during walking. The measuring device 10 is not limited to an activity meter and may be a device configured to measure other living body related information. For example, the measured living body related information is not limited to an activity amount and may be blood pressure, heart rate, respiration rate, electrocardiogram, myoelectricity, brain potential, lung capacity, sleep amount, or body composition information (information indicating the composition of the body such as body weight, height, muscle mass, bone mass, and fat mass). Further, the measured living body related information may be a combination of two or more of these.

The information processing device 20 is a laptop personal computer (PC), for example. Hereinafter, a laptop PC will be used as a representative example of the "information processing device". However, the information processing device may be a different device such as a smart phone, a tablet terminal device, or a desktop PC.

The network 30 for connecting the measuring device 10 and the information processing device 20 employs a near-field wireless communication system, typically Bluetooth Low Energy (BLE). As such, the measuring device 10 and the information processing device 20 are BLE devices having a function of performing wireless communication using BLE.

The information processing device 20 repeatedly executes: operation of advertising for transmitting an advertising packet; and operation of scanning for receiving an advertising packet. On the other hand, the measuring device 10 executes scanning periodically and executes advertising when a predetermined condition is met. Typically, the advertising packet is broadcast. That is, the advertising packet is transmitted to unidentified devices (all devices in a communicable range). Note that the advertising packet may be multicast to a plurality of predetermined devices.

The measuring device 10 and the information processing device 20 utilize the advertising packet to transmit and receive the living body related information measured by the measuring device 10. Hereinafter, the processing contents will be described with reference to FIG. 1.

In FIG. 1, a scenario is assumed in which a user carrying the measuring device 10 approaches the information processing device 20 positioned at a location O. The measuring device 10 stores the measured living body related information (for example, activity amount) in an internal memory. A service ID for identifying a service provided by the information processing device 20 is registered in the measuring device 10, and a device ID for identifying the measuring device 10 receiving the service is registered in the information processing device 20.

Referring to FIG. 1, the information processing device 20 broadcasts an advertising packet (corresponding to (1) in FIG. 1). The advertising packet includes a device ID for identifying the information processing device 20 and a service ID indicating a service provided by the information processing device 20.

Upon receiving the advertising packet including the registered service ID by scanning operation, the measuring device 10 uses a public key to start encryption of the living body related information stored in the internal memory (corresponding to (2) in FIG. 1). The public key is stored in advance in the internal memory of the measuring device 10.

The measuring device 10 estimates a distance between the measuring device 10 and the information processing device 20, on the basis of a received signal strength indicator (RSSI) of the advertising packet and transmission power information included in the advertising packet (corresponding to (3) in FIG. 1). Note that, when the transmission power at the time of transmission of the advertising packet is known, the measuring device 10 may estimate the distance using only the received signal strength indicator.

Subsequently, when the user carrying the measuring device 10 approaches the location O, causing the estimated distance between the measuring device 10 and the information processing device 20 to be less than a predetermined distance, the measuring device 10 broadcasts the advertising packet (corresponding to (4) in FIG. 1). The advertising packet includes the device ID of the measuring device 10 and the encrypted living body related information.

The information processing device 20 receives, by scanning operation, the advertising packet including the device ID of the registered measuring device 10 and decrypts the encrypted living body related information using a private key (corresponding to (5) in FIG. 1). The private key is stored in advance in an internal memory of the information processing device 20.

According to the above, the measuring device 10 starts encryption of the living body related information using a public key upon reception of an advertising packet transmitted from the information processing device 20 and transmits an advertising packet including the living body related information thus encrypted when the distance to the information processing device 20 approaches a certain distance.

In this way, the time from when the measuring device 10 receives the advertising packet to when the measuring device 10 approaches the information processing device 20 can be assigned to the encryption process of the living body related information. As such, when the user arrives at (or is significantly close to) the location O, a situation in which the encryption process is not completed can be avoided. Further, when the distance between the measuring device 10 and the information processing device 20 decreases, the advertising packet is transmitted from the measuring device 10, making it possible to increase the possibility that the information processing device 20 can receive the advertising packet.

Thus, according to the present embodiment, encryption of the living body related information with a public key and transmission of the encrypted living body related information can be performed by the time the user arrives at the location O without making the user aware, thereby improving usability.

Configuration Example

Hardware Configuration
Measuring Device 10

FIG. 2 is a block diagram illustrating an example of a hardware configuration of the measuring device 10. The measuring device 10, as an activity meter, includes a processor 102, a memory 104, an operation interface (I/F) 106, an acceleration sensor 108, a communication interface (I/F) 110, and a display 112 as main components.

The processor 102 typically may be an arithmetic processing unit such as a Central Processing Unit (CPU) or a Multi Processing Unit (MPU). The processor 102 functions as a control unit that controls the operation of each component of the measuring device 10 by reading and executing a program stored in the memory 104. By executing the program, the processor 102 realizes each process (steps) of the measuring device 10 described later.

The memory 104 is realized by a random access memory (RAM), a read-only memory (ROM), a flash memory, and the like. Programs executed by the processor 102, data used by the processor 102, and the like are stored in the memory 104.

The operation interface 106 receives operation input for the measuring device 10 and is composed of various buttons, for example. When the user operates various buttons, a signal corresponding to the operation is input to the processor 102.

The acceleration sensor 108 is, for example, realized by an acceleration sensor capable of detecting acceleration in three-axis directions and detects acceleration applied to the measuring device 10. The detected acceleration is input to the processor 102 as a voltage signal.

The processor 102 calculates the number of steps on the basis of the input acceleration. Typically, the processor 102, when each detection of an acceleration is greater than or equal to a threshold, counts the number thereof as one step. Furthermore, the processor 102 is capable of calculating a walked distance, a walking pitch, a walking speed, calorie consumption, fat burned, an exercise intensity, and the like on the basis of the number of steps. For example, the walking pitch is calculated by dividing the number of steps by the walking time, and the walking speed is calculated by multiplying a stride by the walking pitch. The stride is found by an estimation from a height and an age of the user. Note that the processor 102 may calculate the walking speed of the user on the basis of a horizontal acceleration detected by the acceleration sensor 108.

The communication interface (I/F) 110 is a communication interface for exchanging various data between the measuring device 10 and the information processing device 20. As the communication system, for example, Bluetooth Low Energy (BLE), which is a near-field wireless communication system, may be employed.

The display 112 is composed of a liquid crystal display or the like and displays various information in accordance with the control from the processor 102.

Information Processing Device 20

FIG. 3 is a block diagram illustrating an example of a hardware configuration of the information processing device 20. The information processing device 20, as a laptop PC, includes a processor 202, a memory 204, an input device 206, a communication interface 208 for BLE communication with the measuring device 10, an input/output interface (I/F) 210, and a display 212 composed of a liquid crystal display or the like as main components.

The processor 202 functions as a control unit that controls the operation of each component of the information processing device 20 by reading and executing a program stored in the memory 204 and realizes each process (step) of the information processing device 20 described later.

The memory 204 is realized by a Random Access Memory (RAM), a Read-Only Memory (ROM), a hard disk, and the like and stores the programs executed by the processor 202, the data used by the processor 202, or the like.

The input device 206 receives operation input for the information processing device 20. The input device 206 is realized by, for example, a keyboard, a button, or a mouse. Further, the input device 206 may be realized as a touch panel.

The input/output interface 210 communicates signals to external devices. Typically, the input/output interface 210 communicates with external devices, by using a wired communication system such as a USB or a wired Local Area Network (LAN) or a wireless communication system such as a wireless LAN.

Data Structure

Next, a data structure of the advertising packet (hereinafter also referred to as "advertising packet APi") transmitted from the information processing device 20 and an advertising packet (hereinafter also referred to as "advertising packet APm") transmitted from the measuring device 10 will be described.

FIG. 4 is a diagram illustrating the data structure of the advertising packet APi transmitted from the information processing device 20. Referring to FIG. 4, the advertising packet APi is composed of four fields: "Preamble", "Access Address", "Protocol Data Unit" and "Cyclic Redundancy Check (CRC)". The Protocol Data Unit (PDU) is a field specifying the data carried by the communication packet and is composed of two fields: "Header" and "Payload".

The "Header" field contains PDU Type information for specifying the type of the advertising packet. Specifically, there are four types of advertising packets: "ADV_IND", "ADV_DIRECT_IND", "ADV_NONCONN_IND", and "ADV_SCAN_IND".

The "ADV_IND" and "ADV_DIRECT_IND" are types indicating that connection is possible. Specifically, the "ADV_IND" is a type indicating that an unspecified device can request connection to the transmission source (advertiser) of the advertising packet. The "ADV_DIRECT_IND" is a type indicating that a specified device can request connection to the advertiser.

Further, the "ADV_NONCONN_IND" and "ADV_SCAN_IND" are types indicating that connection is not possible. Specifically, the "ADV_NONCONN_IND" is a type indicating that an unspecified device cannot request connection or request scanning to the advertiser. The "ADV_SCAN_IND" is a type indicating that an unspecified device cannot request connection to the advertiser but can request scanning. The measuring device 10 and the information processing device 20 according to the present embodiment transmit the advertising packets of any of the four types described above.

The "Payload" field is composed of two fields: "Advertiser's Address (AdvA)" and "Advertiser's Data (AdvData)"

". The "AdvA" is an address for identifying a device. The "AdvData" is composed of three fields: "AD Structure 1", "Ad Structure 2", and "AD Structure 3", for example.

Each of the "AD Structure" fields includes "Length" and "Data" fields, and the "Data" field includes "AD Type" and "AD Data" fields.

The "AD Structure 1" field stores Flags indicating control information, the "AD Structure 2" field stores TxPower indicating the transmission power, and the "AD Structure 3" field stores "Manufacture Specific Data" indicating freely selected transmission data.

The "Manufacture Specific Data" includes "Manufacture ID" indicating a device ID for identifying the advertiser (here, the information processing device 20), "Packet Format Ver." indicating a format version of the advertising packet, "Service ID", and "Received Device List".

The Received Device List is, in a case in which the information processing device 20 receives advertising packets transmitted from each of the plurality of measuring devices 10, a list of respective the measuring devices 10. For example, "Device ID 1" stores the device ID of a measuring device M1 of the plurality of measuring devices 10, and "Reception Status Information 1" stores information indicating a reception status (for example, presence or absence of reception) of the encrypted data included in the advertising packet APm from the measuring device M1.

The measuring device 10 according to the present embodiment broadcasts the advertising packet APm including the encrypted data. When a size of the encrypted data exceeds a size of the data transmittable by one advertising packet, the measuring device 10 divides and separately transmits the encrypted data in a plurality of advertising packets APm.

In this case, the measuring device 10 includes, in the advertising packet APm, information indicating sequence numbers of the respective data thus divided and transmits the advertising packet APm. For example, when the size of the encrypted data is 100 octets, the measuring device 10 divides the encrypted data into four data segments of 25 octets each. These four data segments are sequentially defined from the beginning as numbers 1, 2, 3, 4 and transmitted in this sequence.

Specifically, the measuring device 10 transmits the advertising packet APm including a first data segment (portion 1 of 4 from the beginning of the encrypted data) and a sequence number indicating that the data segment is the first. Then, the measuring device 10 transmits the advertising packet APm including a second data segment (portion 2 of 4 from the beginning of the encrypted data) and a sequence number (No. 2). Similarly, the measuring device 10 transmits the advertising packet APm including a third data segment and a sequence number (No. 3) and then transmits the advertising packet APm including a fourth data segment and a sequence number (No. 4).

The information processing device 20 receives the four advertising packets described above and arranges the data segments according to sequence numbers, thereby reconfiguring the encrypted data transmitted from the measuring device 10. Note that, when the encrypted data are divided, the reception status information includes information indicating up to what data segment is being received (for example, number of data segment/number of segments). For example, when up to the second data segment is being received, the reception status information includes the information "2/4".

Figure 5:
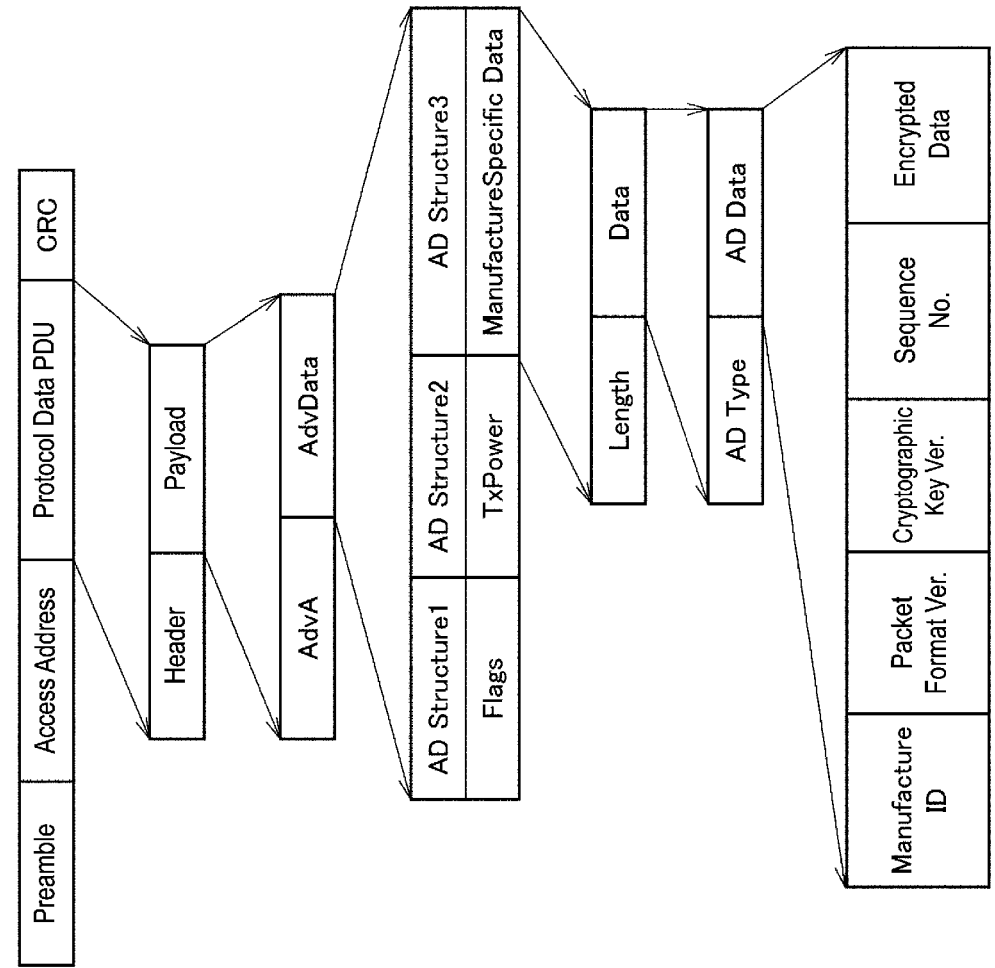
FIG. 5 is a diagram illustrating a data structure of an advertising packet transmitted from the measuring device.

FIG. 5 is a diagram illustrating a data structure of the advertising packet APm transmitted from the measuring device 10. Referring to FIG. 5, the data structures other than that of the "Manufacture Specific Data" field are essentially identical to the data structure illustrated in FIG. 4, and therefore the detailed description thereof will not be repeated.

The "Manufacture Specific Data" in the advertising packet APm indicates "Manufacture ID" indicating the device ID for identifying the advertiser (here, the measuring device 10), "Packet Format Ver.", "Cryptographic Key Ver." indicating the version of the public key, "Sequence Number", and "Encrypted Data".

The Cryptographic Key Ver. is used to indicate the version of the cryptographic key when the cryptographic key is changed to protect against leakage of the cryptographic key. The Sequence Number is information indicating the number of the data segment, as described above. The Encrypted Data are data obtained by encrypting, with a public key, the living body related information measured by the measuring device 10.

Communication Example Using Scanning and Advertising

Figure 6:
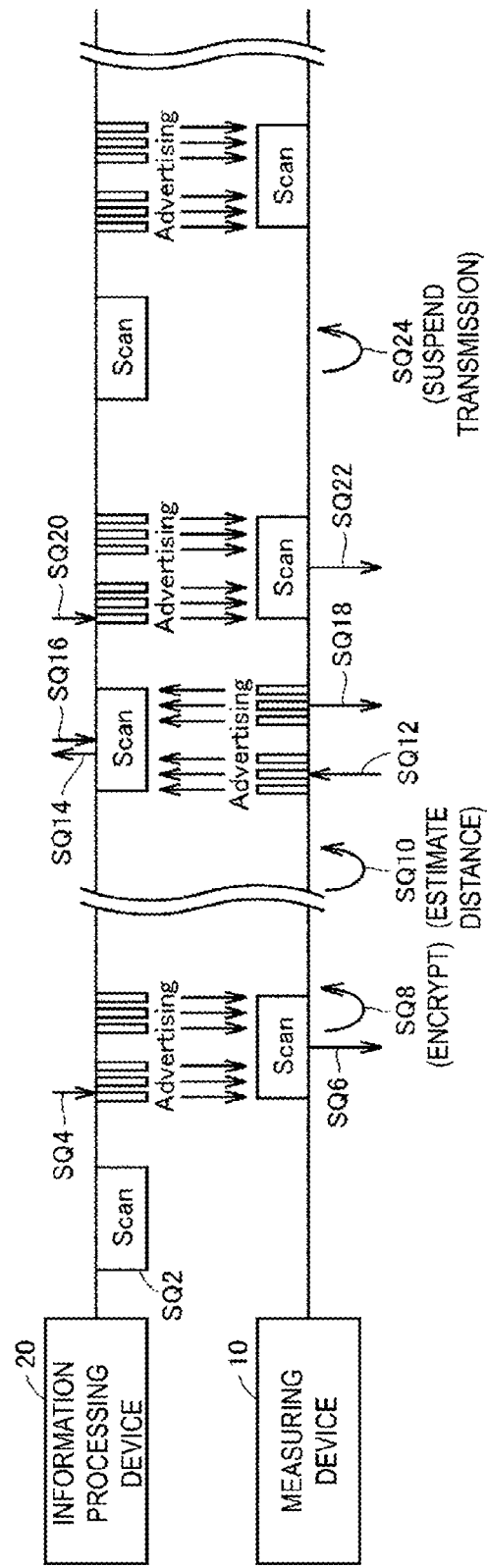
FIG. 6 is a diagram for explaining a data communication example of the measuring device and the information processing device.

Next, an example of data communication using advertising and scanning by the measuring device 10 and the information processing device 20 will be described using FIG. 6. FIG. 6 is a diagram for explaining an example of data communication of the measuring device 10 and the information processing device 20. The information processing device 20 repeatedly executes scanning and advertising, and the measuring device 10 repeatedly executes scanning.

Referring to FIG. 6, the information processing device 20 executes scanning (sequence SQ2). In this case, the measuring device 10 has not executed advertising, and thus the advertising packet APm is not received. Then, the information processing device 20 executes advertising to broadcast the advertising packet APi (sequence SQ4).

The measuring device 10 executes scanning to receive the advertising packet APi (sequence SQ6). When a service ID registered in advance in the measuring device 10 is included in the advertising packet APi, the measuring device 10 uses a public key to start encryption of the measured living body related information (sequence SQ8).

Then, the measuring device 10 measures the received signal strength indicator of the advertising packet APi and uses the received signal strength indicator to calculate an estimated distance De between the measuring device 10 and the information processing device 20 (sequence SQ10). The measuring device 10 calculates the estimated distance De for each reception of the advertising packet APi periodically transmitted from the information processing device 20. As a result, the measuring device 10 can constantly determine the distance from the information processing device 20.

Note that the measuring device 10 starts the encryption process when triggered by reception of the advertising packet APi in sequence SQ6. As such, the measuring device 10 does not restart the encryption process when triggered by reception of the advertising packet APi after the timing of sequence SQ6.

When the encryption process is completed and the estimated distance De between the measuring device 10 and the information processing device 20 is less than the predetermined distance, the measuring device 10 broadcasts the advertising packet APm including the encrypted data (sequence SQ12).

The information processing device 20 receives the advertising packet APm from the measuring device 10 (sequence SQ14). Upon confirmation that the device ID registered in advance is included in the advertising packet APm, the information processing device 20 transmits a scan response (sequence SQ16).

The measuring device 10 receives the scan response (sequence SQ18). Upon reception of the scan response, the measuring device 10 determines that the encrypted data included in the advertising packet APm in the sequence SQ12 is transmitted to the information processing device 20.

The information processing device 20 stores the device ID of the measuring device 10 and the reception status information for the encrypted data in the received device list and broadcasts the advertising packet APi including the received device list (sequence SQ20).

The measuring device 10 executes scanning to receive the advertising packet APi (sequence SQ22). The measuring device 10 checks the presence or absence of the device ID of the measuring device 10 and the reception status information on the basis of the received device list in the advertising packet APi.

When the measuring device 10 determines that its own device ID is present and that the encrypted data has been received in the information processing device 20, the measuring device 10 determines that the encrypted data included in the advertising packet APm in sequence SQ12 is transmitted to the information processing device 20. Thus, the measuring device 10 can confirm transmission completion of the encrypted data even when the scan response cannot be received in sequence SQ18. After confirming transmission completion of the encrypted data to the information processing device 20, the measuring device 10 suspends advertising (sequence SQ24).

Note that, in a case in which the measuring device 10 divides and separately transmits the encrypted data and, by checking the reception status information, finds that a data segment that should be transmitted remains, the measuring device 10 includes and transmits the remaining data segment in the advertising packet APm.

Specific Example

Figure 7:
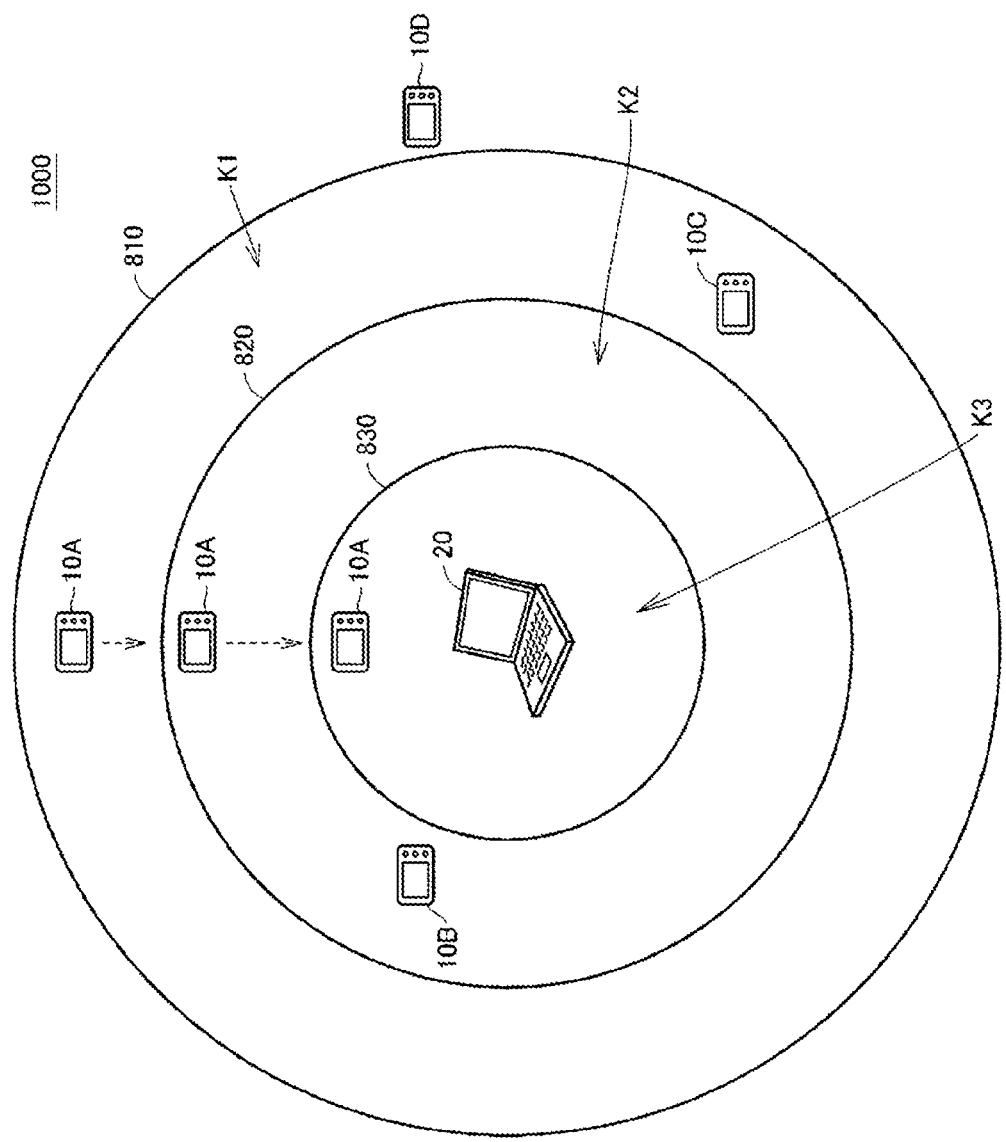
FIG. 7 is a diagram for explaining a specific example in which the communication system is utilized.

FIG. 7 is a diagram for explaining a specific example in which the communication system 1000 is utilized. Referring to FIG. 7, the communication system 1000 includes a plurality of measuring devices 10A to 10D (referred to as the measuring device 10 when described generally or arbitrarily) and the information processing device 20. Each of the plurality of measuring devices 10A to 10D functions as a mobile terminal carried by a user of the measuring device. On the other hand, the information processing device 20 is provided in a predetermined store positioned at the location O and does not move.

A far-distance region K1 indicates a region at a far distance from the information processing device 20 and is represented by a region defined by a circle 810 and a circle 820. A mid-distance region K2 indicates a region at a middle distance where the distance from the information processing device 20 is relatively far and is represented by a region defined by the circle 820 and a circle 830. A near-distance region K3 indicates a region at a near distance from information processing device 20 and is represented by an interior region of the circle 830. Note that the term "distance" of far-distance, mid-distance, and near-distance corresponds to the estimated distance between the measuring device 10 and the information processing device 20.

The measuring device 10 can receive the advertising packet APi from the information processing device 20 when present in the far-distance region K1, the mid-distance region K2, and the near-distance region K3. In the example of FIG. 7, the measuring devices 10A, 10B, 10C can receive the advertising packet APi. On the other hand, the measuring device 10 cannot receive the advertising packet APi from the information processing device 20 when present in the outer region of the circle 810. In the example of FIG. 7, the measuring device 10D cannot receive the advertising packet APi.

Here, a scenario is assumed in which the measuring device 10A moves in order of the far-distance region K1, the mid-distance region K2, and the near-distance region K3 and thus gradually approaches the information processing device 20.

Upon entering the far-distance region K1, the measuring device 10A receives the advertising packet APi broadcast from the information processing device 20. When the measuring device 10A checks the service ID in the advertising packet APi and determines that the service is one utilized by itself, the measuring device 10A uses the public key to start the encryption process of the living body related information stored in the memory 104.

Further, the measuring device 10A calculates the estimated distance De between the information processing device 20 and the measuring device 10A on the basis of the received signal strength indicator and the transmission power of the advertising packet APi. The measuring device 10A does not transmit the advertising packet APm including the encrypted data when present in the far-distance region K1, even when the encryption process is completed. Specifically, when the measuring device 10A determines that the estimated distance De is greater than or equal to a threshold D1, the measuring device 10A does not transmit the advertising packet APm.

Then, upon entering the mid-distance region K2, the measuring device 10A attempts to transmit the advertising packet APm. Specifically, the measuring device 10A determines that the estimated distance De based on the received signal strength indicator of the received advertising packet APi is less than the threshold D1 (that is, determines that the measuring device 10A has entered the mid-distance region K2) and transmits the advertising packet APm including the encrypted data.

When the device ID of the measuring device 10A is included in the advertising packet APi received after transmission of the advertising packet APm, or when a scan response from the information processing device 20 is received, the measuring device 10A determines that the information processing device 20 received the encrypted data (that is, transmission of the encrypted data is completed) and suspends the transmission of the advertising packet APm.

For example, the measuring device 10 makes transitions from a normal mode that permits transmission of the advertising packet APm to a transmission suspension mode that does not permit the transmission of the advertising packet APm. In this way, the transmission of the advertising packet 10 is suspended, which makes it possible to reduce the occurrence of wireless interference when the other measuring devices 10 (for example, the measuring devices 10B, 10C) and the information processing device 20 communicate.

Here, when a large number of measuring devices 10 of other users are present in the periphery of the measuring device 10A, wireless interference may occur and thus transmission of the advertising packet APm may fail (that is, the information processing device 20 may not be able to receive the advertising packet APm). Thus, when transmission completion of the encrypted data cannot be confirmed, the measuring device 10A retransmits the advertising packet APm. When the measuring device 10A is in the mid-distance region K2, the measuring device 10A transmits the advertising packet APm at a cycle P1.

Note that, when the encrypted data are divided, the measuring device 10A sequentially transmits the advertising packet APm including the data segments at the cycle P1. The measuring device 10A suspends transmission of the advertising packet APm when transmission completion of the encrypted data is confirmed.

Then, the measuring device 10A enters the near-distance region K3. When transmission of the encrypted data is completed in the mid-distance region K2, the transmission suspension mode for the advertising packet APm is maintained.

On the other hand, when transmission of the encrypted data is not completed, the measuring device 10A transmits the advertising packet APm. Here, because the near-distance region K3 has a shorter distance between the measuring device 10A and the information processing device 20 than the mid-distance region K2 and is less susceptible to wireless interference, it is highly likely that the advertising packet APm is received by the information processing device 20. Thus, the measuring device 10A transmits the advertising packet APm at a cycle P2 that is shorter than the cycle P1. This makes it possible to accelerate transmission completion of the encrypted data.

Upon arrival at the store, the user can receive various services depending on the contents of the living body related information of the user stored in the information processing device 20 installed in the store. For example, when the number of steps of the living body related information is greater than or equal to a certain number, a service of receiving a beverage can be received.

The transmission suspension mode described above is canceled when a certain condition is satisfied. Specifically, when a reference time T1 (for example, 15 minutes) or longer elapses after the measuring device 10A can no longer receive the advertising packet APi (that is, after the measuring device 10A moves outside the circle 810), the measuring device 10A cancels the transmission suspension mode. Specifically, the measuring device 10A makes transitions to the normal mode, and the advertising packet APm becomes transmittable. Therefore, for example, when the user returns to the store after being away for a while, the measuring device 10A can encrypt newly acquired living body related information and transmit the information to the information processing device 20.

Further, when a reference time T2 (for example, 60 minutes) or longer elapses after transition to the transmission suspension mode, the measuring device 10A cancels the transmission suspension mode. Therefore, for example, even when the user continues to stay in the store, the measuring device 10A can encrypt newly acquired living body related information and transmit the information to the information processing device 20.

Further, the measuring device 10 may also notify the user of a progress status of a series of processes until transmission completion of the encrypted data of the living body related information. The progress status of a series of processes includes the progress status of the encryption process of the living body related information and the transmission process of the encrypted data. For example, the measuring device 10 broadcasts information indicating a start and an end of the encryption process and information indicating a start and an end of the transmission process of the encrypted data. The measuring device 10 may display this information on the display 112, may output sound on the information via a speaker, or may notify the user of the information using a lamp.

Functional Configuration

Figure 8:
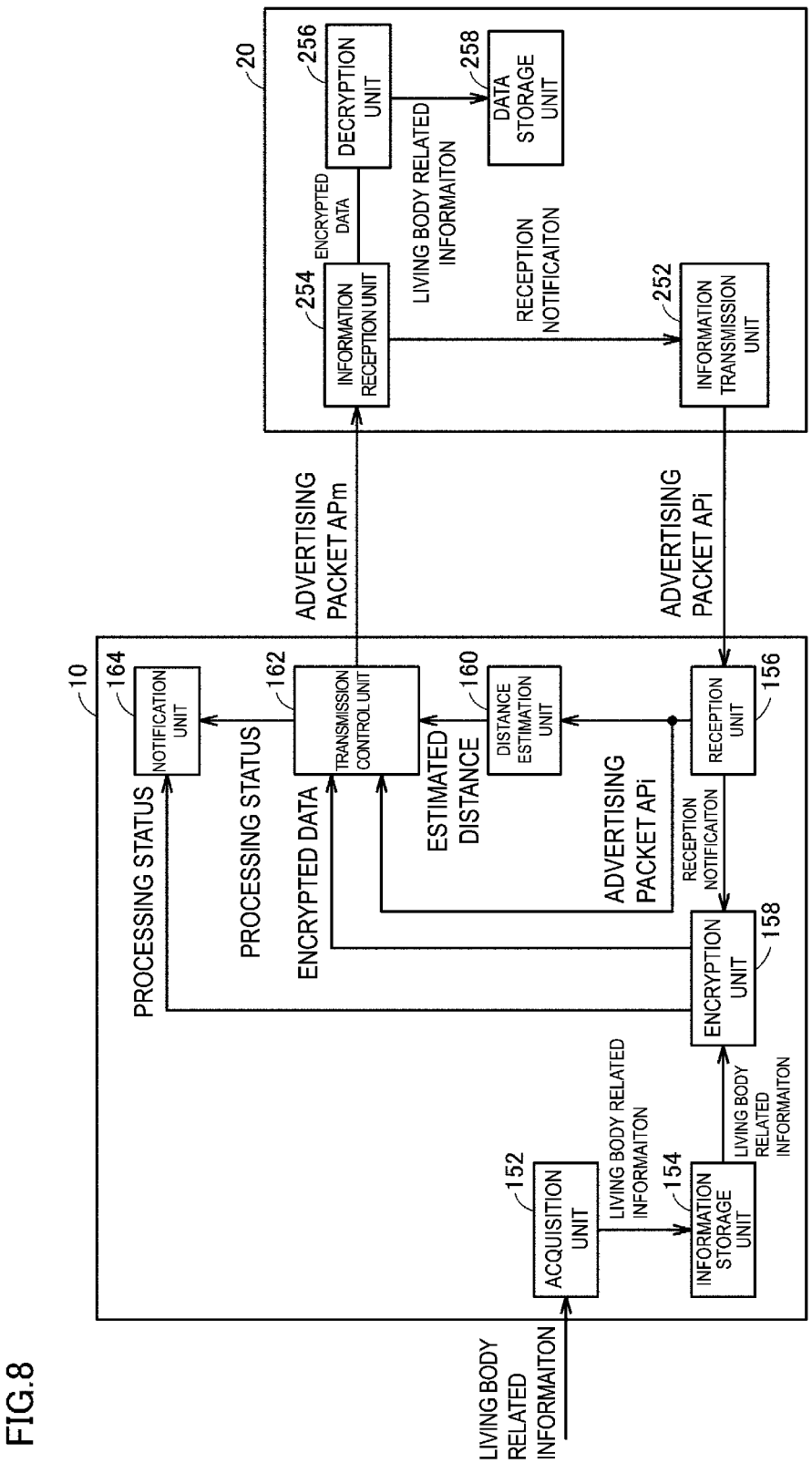
FIG. 8 is a block diagram illustrating an example of a functional configuration of the measuring device and the information processing device.

FIG. 8 is a block diagram illustrating an example of a functional configuration of the measuring device 10 and the information processing device 20. Referring to FIG. 8, the measuring device 10 includes an acquisition unit 152, an information storage unit 154, a reception unit 156, an encryption unit 158, a distance estimation unit 160, a transmission control unit 162, and a notification unit 164. The information processing device 20 includes an information transmission unit 252, an information reception unit 254, a decryption unit 256, and a data storage unit 258.

The acquisition unit 152 of the measuring device 10 acquires the living body related information of the user. Specifically, the acquisition unit 152 measures the living body related information of the user and stores the living body related information thus measured and acquired in the information storage unit 154.

The information transmission unit 252 of the information processing device 20 broadcasts the advertising packet APi at each predetermined cycle.

The reception unit 156 of the measuring device 10 receives the advertising packet APi by scanning operation. The reception unit 156 outputs the advertising packet APi to the distance estimation unit 160 and the transmission control unit 162 and outputs a reception notification of the advertising packet APi to the encryption unit 158. Typically, the reception unit 156 executes output of the advertising packet APi and the reception notification when the service ID registered in the measuring device 10 is included in the advertising packet APi.

When the reception unit 156 receives the advertising packet APi (for example, when the reception notification is received from the reception unit 156), the encryption unit 158 uses the public key to start encryption of the living body related information stored in the information storage unit 154. The encryption unit 158 outputs the encrypted data of the living body related information to the transmission control unit 162. Further, the encryption unit 158 outputs processing status information indicating the progress status of the encryption process (for example, encryption started, encryption in progress, encryption completed) to the notification unit 164.

The distance estimation unit 160 measures the received signal strength indicator of the advertising packet APi and calculates the estimated distance De between the measuring device 10 and the information processing device 20 on the basis of the measured received signal strength indicator. Typically, the distance estimation unit 160 calculates the estimated distance De on the basis of the received signal strength indicator and the transmission power included in the advertising packet APi. Note that, when the transmission power is known, the distance estimation unit 160 may calculate the estimated distance De using only the received signal strength indicator.

When the estimated distance De is less than the threshold D1, the transmission control unit 162 broadcasts the advertising packet APm including the encrypted data of the living body related information. Further, the transmission control unit 162 outputs, to the notification unit 164, processing status information indicating the progress status of the transmission process of the advertising packet APm (for example, transmission started, transmission in progress, transmission completed).

In some embodiments, the transmission control unit 162 determines whether the advertising packet APi received after transmission of the advertising packet APm includes response information indicating that the information processing device 20 received the advertising packet APm (for example, the device ID of the measuring device 10 and the reception status information). When the response information is included, the transmission control unit 162 determines that transmission of the encrypted data of the living body related information is completed and suspends transmission of the advertising packet APm. In this case, the transmission control unit 162 makes transitions of the operation mode of the measuring device 10 from the normal mode to the transmission suspension mode of the advertising packet APm. Note that the response information may be a scan response transmitted from the information processing device 20 and received by the reception unit 156.

In other embodiments, when the reference time T1 or longer elapses after suspension of transmission of the advertising packet APm (for example, after transition to the transmission suspension mode), the transmission control unit 162 cancels the suspension of transmission of the advertising packet APm. Alternatively, when transmission of the advertising packet APm is suspended and the reference time T2 or longer elapses after reception of the advertising packet APi becomes impossible, the transmission control unit 162 may cancel the suspension of the transmission of the advertising packet APm. In this case, the transmission control unit 162 makes transitions of the operation mode of the measuring device 10 from the transmission suspension mode to the normal mode.

In yet other embodiments, when the estimated distance De is less than the threshold D1 and greater than or equal to a threshold D2 which is less than the threshold D1 (for example, when the measuring device 10 is in the mid-distance region K2) the transmission control unit 162 transmits the advertising packet APm at the cycle P1. Further, when the estimated distance De is less than the threshold D2 (for example, when the measuring device 10 is in the near-distance region K3), the transmission control unit 162 transmits the advertising packet APm at the cycle P2 that is shorter than the cycle P1.

The notification unit 164 notifies the user of the progress status of the series of processes until transmission of the encrypted data of the living body related information is completed. Specifically, the notification unit 164 uses the processing status information from the encryption unit 158 to notify the user of information indicating, in relation to the living body related information, encryption started, encryption in progress, and encryption completed. Further, the notification unit 164 uses the processing status information from the transmission control unit 162 to notify the user of information indicating, in relation to the advertising packet APm, transmission started, transmission in progress, and transmission completed.

The notification form of the notification unit 164 is not particularly limited, and the user needs only be notified of each kind of information in a distinguishable manner. Typically, the notification unit 164 notifies the user of each kind of information using an information display on the display, sound output via a speaker, light emission of a light-emitting diode (LED), or the like.

When the estimated distance De is less than the threshold D1, the information reception unit 254 of the information processing device 20 receives the advertising packet APm including the encrypted data of the living body related information transmitted from the measuring device 10 (specifically, the transmission control unit 162). The information reception unit 254 outputs the encrypted data to the decryption unit 256 and outputs a reception notification of the encrypted data to the information transmission unit 252. Typically, the information reception unit 254 outputs the encrypted data and the reception notification when the device ID registered in the information processing device 20 is included in the advertising packet APm.

The decryption unit 256 decrypts the encrypted data using a private key stored in advance in the memory 204 and stores the decrypted living body related information in the data storage unit 258.

When the advertising packet APm transmitted from the measuring device 10 is received (for example, when the reception notification is received), the information transmission unit 252 stores the device ID of the measuring device 10 and the reception status information in the advertising packet APi as information indicating that the advertising packet APm is received. The information transmission unit 252 transmits the advertising packet APi including this information.

Processing Procedure
Information Processing Device 20

Figure 9:
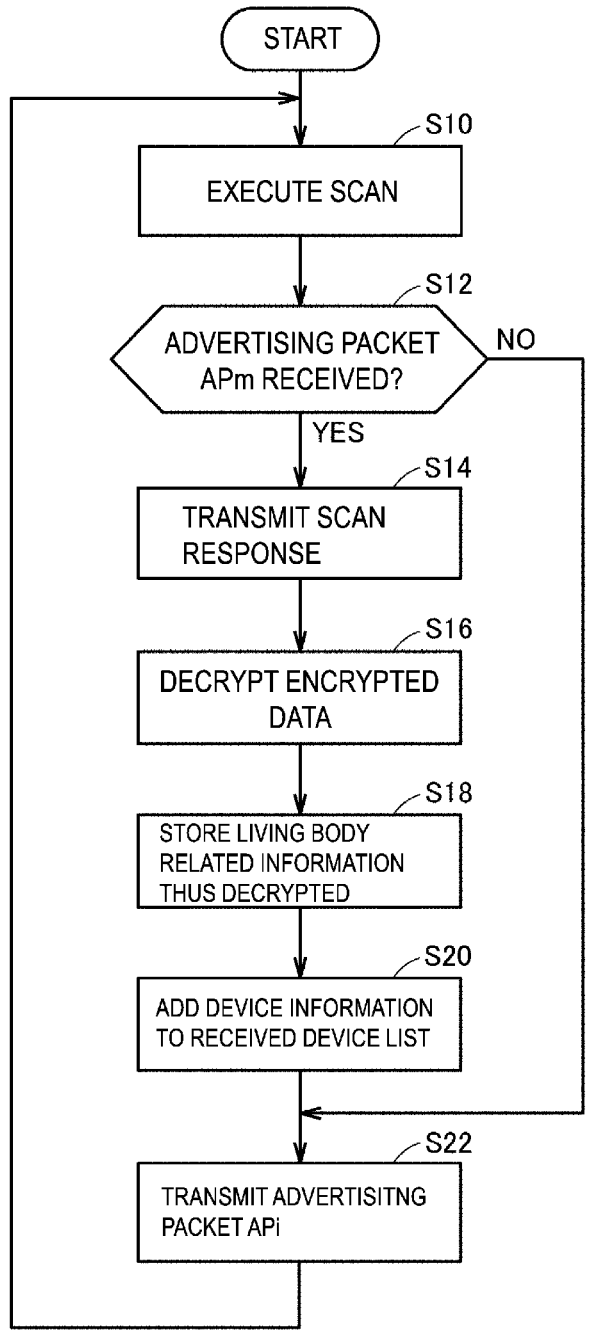
FIG. 9 is a flowchart illustrating an example of a processing procedure of the information processing device.

FIG. 9 is a flowchart illustrating an example of a processing procedure of the information processing device 20. Each step in FIG. 9 is mainly executed by the processor 202 of the information processing device 20.

Referring to FIG. 9, the information processing device 20 executes a scan (step S10). The information processing device 20 determines whether the advertising packet APm from the measuring device 10 registered in advance is received (step S12). Specifically, when the device ID included in the advertising packet APm matches the device ID stored in the memory 204, the information processing device 20 determines that the advertising packet APm from the measuring device 10 registered in advance is received.

When the advertising packet APm has not been received (NO in step S12), the information processing device 20 executes the processing of step S22 described later. When the advertising packet APm is received (YES in step S12), the information processing device 20 transmits a scan response (step S14).

The information processing device 20 uses a private key to decrypt the encrypted data of the living body related information included in the advertising packet APi (step S16). The information processing device 20 stores the decrypted living body related information in the memory 204 (step S18). The information processing device 20 adds the device ID and the reception status information of the measuring device 10 to the received device list (step S20). The processing of step S20 may be executed between steps S14 and S16.

The information processing device 20 broadcasts the advertising packet APi (step S22) and repeats the processing from step S10. Note that, when the advertising packet APm is received in step S12, the advertising packet APi transmitted in step S22 includes the device ID of the measuring device 10 and the reception status information.

Measuring Device 10

FIG. 10 is a flowchart illustrating an example of a processing procedure of the measuring device 10. Each step in FIG. 10 is mainly executed by the processor 102 of the measuring device 10.

Referring to FIG. 10, the measuring device 10 executes scanning operation (step S50) and determines whether the advertising packet APi for providing a service registered in advance is received (step S52). Specifically, when the service ID included in the advertising packet APi matches the service ID registered (stored) in the memory 104, the measuring device 10 determines that the advertising packet APi for providing a service registered in advance is received.

When the advertising packet APi has not been received (NO in step S52), the measuring device 10 executes the processing of step S50. When the advertising packet APi is received (YES in step S52), the measuring device 10 uses the public key to start encryption of the living body related information stored in the memory 104 (step S54).

The measuring device 10 determines whether the encryption of the living body related information is completed (step S56). When encryption has not been completed (NO in step S56), the measuring device 10 executes the processing of step S56. When encryption is completed (YES in step S56), the measuring device 10 broadcasts the advertising packet APm including the encrypted data of the living body related information (step S58).

The measuring device 10 determines whether a scan response from the information processing device 20 is received (step S60). When the scan response is received (YES in step S60), the measuring device 10 executes the processing in step S68 described later. When the scan response has not been received (NO in step S60), the measuring device 10 executes scanning operation (step S62).

Then, the measuring device 10 determines whether the advertising packet APi including the service ID registered in advance is received (step S64). When the advertising packet APi has not been received (NO in step S64), the measuring device 10 executes the processing of step S62. When the advertising packet APi is received (YES in step S64), the measuring device 10 determines whether the advertising packet APi includes its own device ID (step S66).

When the device ID is not included (NO in step S66), the measuring device 10 executes the processing of step S58. That is, the measuring device 10 re-broadcasts the advertising packet APm including the encrypted data. When the device ID is included (YES in step S66), the measuring device 10 determines whether transmission of the encrypted data is completed (step S68).

Specifically, the measuring device 10 checks the reception status information included in the advertising packet APi received in step S66. When the reception status information indicates that the encrypted data is received, the measuring device 10 determines that the transmission of the encrypted data is completed. Note that when the encrypted data are divided and the reception status information indicates that all data segments are received, the measuring device 10 determines that the transmission of the encrypted data is completed.

When transmission of the encrypted data has not been completed (NO in step S68), the measuring device 10 executes the processing of step S58. When transmission of the encrypted data is completed (YES in step S68), the measuring device 10 suspends transmission of the advertising packet APm (step S70). For example, the measuring device 10 makes transitions from the normal mode to the transmission suspension mode.

Advantages

According to the present embodiment, the time from when the measuring device 10 receives the advertising packet to when the measuring device 10 approaches the information processing device 20 can be assigned to the public key based encryption process of the living body related information. Therefore, even when the measuring device is not capable of utilizing a microcomputer having a large processing capacity from the perspective of cost or size, the user does not notice the length of the encryption processing time.

When the distance between the measuring device 10 and the information processing device 20 decreases, the advertising packet from the measuring device 10 is transmitted, making it possible to avoid wireless interference to the extent possible and thus increasing a transmission success rate of the advertising packet.

With use of a public key encryption system, it takes less time and effort to exchange cryptographic keys than a common key encryption system, and complicated cryptographic key generation and cryptographic key distribution management are not required, resulting in higher security.

The distance between the measuring device 10 and the information processing device 20 is estimated using the received signal strength indicator, which is more cost effective than distance estimation using a Global Positioning System (GPS) or the like.

Other Embodiments (1) While the embodiment described above describes a configuration in which the communication system 1000 includes the measuring device 10 and the information processing device 20, the configuration is not limited thereto and may further include a server. In this case, for example, the information processing device 20 receives the encrypted data from the measuring device 10 and transmits the encrypted data to the server via a network such as the Internet. The server uses a private key to decrypt the encrypted data thus received and stores the data in an internal memory.

(2) While the embodiment described above describes a configuration in which the transmission cycle of the advertising packet APm is changed in accordance with the distance between the measuring device 10 and the information processing device 20, the configuration is not limited thereto. For example, the configuration may be such that the transmission cycle of the advertising packet APm is changed in accordance with the walking speed of the user carrying the measuring device 10, the walking speed being the living body related information.

In this case, the measuring device 10 (the transmission control unit 162) transmits the advertising packet APm at the cycle P1 when the measured walking speed is less than a predetermined speed and transmits the advertising packet APm at the cycle P2 (less than P1) when the walking speed is greater than or equal to the predetermined speed. In this way, when the user has a fast walking speed and it is possible that the user will quickly reach the location where the information processing device 20 is positioned, the transmission cycle of the advertising packet APm is shortened. As such, the transmission of the encrypted data can be completed by the time the user reaches the location.

(3) In the embodiments described above, a program may be provided that causes a computer to function and execute controls such as those described in the flowcharts described above. Such a program can also be provided as a program product stored on a non-temporary computer-readable recording medium attached to a computer, such as a flexible disk, a compact disc read only memory (CD-ROM), a secondary storage device, a main storage device, and a memory card. Alternatively, a program may be provided, which is stored on a recording medium such as a hard disk built into a computer. The program may also be provided by download via a network.

(4) The configuration given as an example of the embodiment described above is an example configuration of the present invention. The configuration can be combined with other known technology, and parts thereof may be omitted or modified within the scope of the present invention. Furthermore, the processes and configurations of other embodiments may be employed as appropriate to the embodiments described above.

Supplementary Notes

As described above, the present embodiment includes disclosures such as described below.

Configuration 1

A measuring device (10) that is portable and configured to be capable of Bluetooth Low Energy (BLE) communication with an information processing device (20), the measuring device (10) including
an acquisition unit (152) configured to acquire living body related information of a user of the measuring device (10),
a reception unit (156) configured to receive a first advertising packet transmitted at a predetermined cycle from the information processing device (20),
an encryption unit (158) configured to start encryption of the living body related information using a public key when the first advertising packet is received,
a distance estimation unit (160) configured to calculate an estimated distance between the measuring device (10) and the information processing device (20), based on a received signal strength indicator of the first advertising packet, and
a transmission control unit (162) configured to transmit a second advertising packet including the living body related information thus encrypted when the estimated distance is less than a first threshold.

Configuration 2

The measuring device (10) according to configuration 1, wherein
when the first advertising packet received after transmission of the second advertising packet includes information indicating that the information processing device (20) received the second advertising packet, the transmission control unit (162) is configured to suspend transmission of the second advertising packet.

Configuration 3

The measuring device (10) according to configuration 2, wherein
when a first reference time or longer has elapsed since suspension of transmission of the second advertising packet, the transmission control unit (162) is configured to cancel the suspension of transmission of the second advertising packet.

Configuration 4

The measuring device (10) according to configuration 2 or 3, wherein
when transmission of the second advertising packet is suspended and a second reference time or longer elapses after reception of the first advertising packet becomes impossible, the transmission control unit (162) is configured to cancel the suspension of transmission of the second advertising packet.

Configuration 5

The measuring device (10) according to any one of configurations 1 to 4, wherein
the transmission control unit (162) is configured to
transmit the second advertising packet at a first cycle when the estimated distance is less than the first threshold and is greater than or equal to a second threshold that is less than the first threshold and
transmit the second advertising packet at a second cycle shorter than the first cycle when the estimated distance is less than the second threshold.

Configuration 6

The measuring device (10) according to configuration 5, wherein
the living body related information includes a walking speed of the user who carries the measuring device (10) and
when the walking speed is greater than or equal to a predetermined speed, the transmission control unit (162) is configured to transmit the second advertising packet at the second cycle.

Configuration 7

The measuring device (10) according to one of configurations 1 to 6, further including
a notification unit (164) configured to notify the user of a progress status of a series of processes until completion of transmission of the living body related information thus encrypted.

Configuration 8

An information processing device (20) configured to be capable of Bluetooth Low Energy (BLE) communication with a measuring device (10) that is portable, the information processing device (20) including
a transmission unit (252) configured to transmit a first advertising packet at a predetermined cycle and
a reception unit (254), wherein
the measuring device (10) is configured to start encryption of living body related information of a user of the measuring device (10) using a public key when the first advertising packet is received and
the reception unit (254) is configured to receive a second advertising packet including the living body related information thus encrypted and transmitted from the measuring device (10) when an estimated distance between the information processing device (20) and the measuring device (10) based on a received signal strength indicator of the first advertising packet is less than a first threshold.

Configuration 9

A communication system (1000) including
a plurality of measuring devices (10), each being portable, and
an information processing device (20) configured to be capable of Bluetooth Low Energy (BLE) communication with each of the plurality of measuring devices (10), wherein each of the plurality of measuring devices (10) includes
an acquisition unit (152) configured to acquire living body related information of a user of the measuring device (10),
a reception unit (156) configured to receive a first advertising packet transmitted at a predetermined cycle from the information processing device (20),
an encryption unit (158) configured to start encryption of the living body related information using a public key when the first advertising packet is received,
a distance estimation unit (160) configured to calculate an estimated distance between the measuring device (10) and the information processing device (20), based on a received signal strength indicator of the first advertising packet, and
a transmission control unit (162) configured to transmit a second advertising packet including the living body related information thus encrypted when the estimated distance is less than a first threshold.

The embodiments described herein are illustrative in all respects and are not intended as limitations. The scope of the present invention is indicated not by the descriptions above but by the claims and includes all meaning equivalent to the scope and changes within the scope.

REFERENCE SIGNS LIST 10, 10A to 10D Measuring device
20 Information processing device
30 Network
102, 202 Processor
104, 204 Memory
106 Operation interface
108 Acceleration sensor
110, 208 Communication interface
112, 212 Display
152 Acquisition unit
154 Information storage unit
156 Reception unit
158 Encryption unit
160 Distance estimation unit
162 Transmission control unit
164 Notification unit
206 Input device
210 Input/Output interface
252 Information transmission unit
254 Information reception unit
256 Decryption unit
258 Data storage unit
1000 Communication system
K1 Far-distance region
K2 Mid-distance region
K3 Near-distance region

The invention claimed is:

1. A measuring device that is portable and configured to be capable of Bluetooth Low Energy (BLE) communication with an information processing device, the measuring device comprising:
an acquisition unit configured to acquire living body related information of a user of the measuring device;
a reception unit configured to receive a first advertising packet transmitted at a predetermined cycle from the information processing device;
an encryption unit configured to start encryption of the living body related information using a public key when the first advertising packet is received;
a distance estimation unit configured to calculate an estimated distance between the measuring device and the information processing device, based on a received signal strength indicator of the first advertising packet; and
a transmission control unit configured to transmit a second advertising packet including the living body related information thus encrypted when the estimated distance is less than a first threshold.

2. The measuring device according to claim 1, wherein when the first advertising packet received after transmission of the second advertising packet includes information indicating that the information processing device received the second advertising packet, the transmission control unit is configured to suspend transmission of the second advertising packet.

3. The measuring device according to claim 2, wherein when a first reference time or longer has elapsed since suspension of transmission of the second advertising packet, the transmission control unit is configured to cancel the suspension of transmission of the second advertising packet.

4. The measuring device according to claim 2, wherein when transmission of the second advertising packet is suspended and a second reference time or longer elapses after reception of the first advertising packet becomes impossible, the transmission control unit is configured to cancel the suspension of transmission of the second advertising packet.

5. The measuring device according to claim 1, wherein the transmission control unit is configured to
transmit the second advertising packet at a first cycle when the estimated distance is less than the first threshold and is greater than or equal to a second threshold that is less than the first threshold and
transmit the second advertising packet at a second cycle shorter than the first cycle when the estimated distance is less than the second threshold.

6. The measuring device according to claim 5, wherein the living body related information includes a walking speed of the user who carries the measuring device and when the walking speed is greater than or equal to a predetermined speed, the transmission control unit is configured to transmit the second advertising packet at the second cycle.

7. The measuring device according to claim 1, further comprising
a notification unit configured to notify the user of a progress status of a series of processes until completion of transmission of the living body related information thus encrypted.

8. An information processing device configured to be capable of Bluetooth Low Energy (BLE) communication with a measuring device that is portable, the information processing device comprising:
a transmission unit configured to transmit a first advertising packet at a predetermined cycle; and
a reception unit, wherein
the measuring device is configured to start encryption of living body related information of a user of the measuring device using a public key when the first advertising packet is received and
the reception unit is configured to receive a second advertising packet including the living body related information thus encrypted and transmitted from the measuring device when an estimated distance between the information processing device and the measuring device based on a received signal strength indicator of the first advertising packet is less than a first threshold.

9. A communication system comprising:

a plurality of measuring devices, each being portable; and an information processing device configured to be capable of Bluetooth Low Energy (BLE) communication with each of the plurality of measuring devices, wherein each of the plurality of measuring devices includes an acquisition unit configured to acquire living body related information of a user of the measuring device, a reception unit configured to receive a first advertising packet transmitted at a predetermined cycle from the information processing device, an encryption unit configured to start encryption of the living body related information using a public key when the first advertising packet is received, a distance estimation unit configured to calculate an estimated distance between the measuring device and the information processing device, based on a received signal strength indicator of the first advertising packet, and a transmission control unit configured to transmit a second advertising packet including the living body related information thus encrypted when the estimated distance is less than a first threshold.

* * * * *